United States Patent [19]
Polster

[11] Patent Number: 6,103,284
[45] Date of Patent: Aug. 15, 2000

[54] METHOD OF PREPARING WAXED IN-SHELL EGGS

[76] Inventor: Louis S. Polster, 2205 Marthas Rd., Alexandria, Va. 22307

[21] Appl. No.: 09/001,674

[22] Filed: Dec. 31, 1997

[51] Int. Cl.[7] .................................. A23B 5/00; A23L 1/32
[52] U.S. Cl. ............................................ 426/298; 426/614
[58] Field of Search ....................................... 426/298, 614

[56] References Cited

U.S. PATENT DOCUMENTS

| | | |
|---|---|---|
| 212,007 | 2/1879 | Inglis et al. . |
| 709,583 | 9/1902 | Schöning . |
| 1,092,897 | 4/1914 | Clairemont . |
| 1,163,873 | 12/1915 | Thornburgh . |
| 1,197,707 | 9/1916 | Bennett . |
| 1,261,724 | 4/1918 | Duke . |
| 1,388,024 | 8/1921 | Clairemont et al. . |
| 1,520,424 | 12/1924 | McCullough . |
| 1,888,415 | 11/1932 | Swenson . |
| 1,922,143 | 8/1933 | Sharp . |
| 1,943,468 | 1/1934 | Bridgeman et al. . |
| 2,001,628 | 5/1935 | Niernick . |
| 2,184,063 | 12/1939 | Meyer et al. . |
| 2,222,000 | 11/1940 | Schmidt . |
| 2,236,773 | 4/1941 | Fischer . |
| 2,337,666 | 12/1943 | Koonz et al. . |
| 2,423,233 | 7/1947 | Funk . |
| 2,438,168 | 3/1948 | Hearst et al. . |
| 2,439,808 | 3/1948 | Hodson . |
| 2,497,817 | 2/1950 | Hale et al. . |
| 2,565,311 | 8/1951 | Koonz et al. . |
| 2,673,160 | 3/1954 | Feeney et al. . |
| 2,758,935 | 8/1956 | Shaffer . |
| 2,776,214 | 1/1957 | Lloyd et al. . |
| 3,027,734 | 4/1962 | Mills . |
| 3,028,245 | 4/1962 | Mink et al. . |
| 3,046,143 | 7/1962 | Lowe et al. . |
| 3,082,097 | 3/1963 | Haller . |

(List continued on next page.)

FOREIGN PATENT DOCUMENTS

| | | |
|---|---|---|
| 2680951-A1 | 3/1993 | France . |
| 72454 | 4/1953 | Netherlands . |
| 242780 | 11/1925 | United Kingdom . |
| WO 92/21254 | 12/1992 | WIPO . |
| WO 95/12320 | 5/1995 | WIPO . |
| WO 95/14388 | 6/1995 | WIPO . |
| WO 95/18538 | 7/1995 | WIPO . |
| WO 97/07691 | 3/1997 | WIPO . |

OTHER PUBLICATIONS

Database Abstract. AN: 78 (04):Q0043 FSTA. USSR Patent, 577009. Inventors: Krivopishin et al, 1977.

E.M. Funk, "Pasteurization of Shell Eggs," University of Missouri, College of Agriculture, Agricultural Experiment Station, Research Bulletin 364, pp. 1–28 (May 1943).

M.E. St. Louis, "The Emergence of Grade A Eggs as a Major Source of *Salmonella Enteritidis* Infections," JAMA vol. 259, No. 14, pp. 2103–2107 (Apr. 8, 1988).

E.M. Funk, "Maintenance of Quality in Shell Eggs by Thermostabilization," University of Missouri, College of Agriculture, Agricultural Experiment Station, Research Bulletin 467, pp. 1–46 (Dec. 1950).

Food Industry, vol. p 341, Mar. 1948, p. 71.

E.M. Funk, "Stabilizing Quality in Shell Eggs," University of Missouri, College of Agriculture, Agricultural Experiment Station, Research Bulletin 362, pp. 1–38 (Apr. 1943).

Remington's Pharmaceutical Sciences, 16th Edition, Mack Publishing Co., Easton, PA (1980).

Oliver Products Company, "The Oliver® Aqua–Therm™/Compu–Therm™ Water Convection Oven System," Brochure No. 11134–1–5/93.

*Primary Examiner*—Anthony J. Weier
*Attorney, Agent, or Firm*—Oliff & Berridge, PLC

[57] ABSTRACT

A process for waxing in-shell eggs and eggs prepared thereby. In one embodiment, the process for waxing in-shell eggs is directed to waxing an in-shell egg including passing the egg through a molten wax layer disposed on the surface of a heated liquid which is vertically perturbated.

32 Claims, 1 Drawing Sheet

U.S. PATENT DOCUMENTS

| | | |
|---|---|---|
| 3,113,872 | 12/1963 | Jones et al. . |
| 3,144,342 | 8/1964 | Collier et al. . |
| 3,148,649 | 9/1964 | Moore et al. . |
| 3,321,316 | 5/1967 | De Paolis et al. . |
| 3,364,037 | 1/1968 | Mink et al. . |
| 3,420,790 | 1/1969 | Gassner et al. . |
| 3,440,831 | 4/1969 | Thompson . |
| 3,461,680 | 8/1969 | Rische . |
| 3,522,061 | 7/1970 | Whiteford . |
| 3,658,558 | 4/1972 | Rogers et al. . |
| 3,663,233 | 5/1972 | Keszler . |
| 3,831,389 | 8/1974 | Lipona . |
| 3,843,813 | 10/1974 | Driggs . |
| 3,865,965 | 2/1975 | Davis et al. . |
| 3,882,686 | 5/1975 | Rose . |
| 4,045,579 | 8/1977 | Rogers . |
| 4,157,650 | 6/1979 | Guibert . |
| 4,302,142 | 11/1981 | Kuhl et al. . |
| 4,362,094 | 12/1982 | Polster . |
| 4,503,320 | 3/1985 | Polster . |
| 4,524,082 | 6/1985 | Liot . |
| 4,524,083 | 6/1985 | Liot . |
| 4,537,208 | 8/1985 | Kuhl . |
| 4,558,661 | 12/1985 | Theilig et al. . |
| 4,666,722 | 5/1987 | Creed et al. . |
| 4,702,777 | 10/1987 | Kuhl . |
| 4,808,425 | 2/1989 | Swartzel et al. . |
| 4,999,471 | 3/1991 | Guarneri et al. . |
| 5,179,265 | 1/1993 | Sheridan et al. . |
| 5,283,072 | 2/1994 | Cox et al. . |
| 5,290,583 | 3/1994 | Reznik et al. . |
| 5,431,939 | 7/1995 | Cox et al. . |
| 5,445,062 | 8/1995 | Polster . |
| 5,474,794 | 12/1995 | Anderson et al. . |
| 5,494,687 | 2/1996 | Polster . |
| 5,589,211 | 12/1996 | Cox et al. . |
| 5,694,836 | 12/1997 | Blevins . |

METHOD OF PREPARING WAXED IN-SHELL EGGS

BACKGROUND OF THE INVENTION

The present invention is directed to processes for waxing in-shell eggs and to eggs prepared by such processes.

Coating of in-shell eggs, particularly chicken eggs, for extending their shelf-life is referenced in a variety of patents and publications. Some of these references relate to, for example (1) smearing a wax layer on an in-shell egg by hand (GB 242,780); (2) applying egg albumin on an in-shell egg by dipping or using a sponge as an applicator (U.S. Pat. No. 1,261,724); (3) applying an oil-in-water emulsion (containing various additives) on an in-shell egg by spraying or brushing (U.S. Pat. Nos. 2,438,168; 2,222,000); (4) spraying a wax layer on an in-shell egg (U.S. Pat. No. 2,439,808); and (5) coating in-shell eggs with plastics, greases, oils and the like by dipping them into a reservoir of the coating material (e.g., a reservoir containing molten wax) (E. M. Funk, Maintenance of Quality in Shell Eggs by Thermostabilization, University of Missouri, College of Agriculture, Agricultural Experiment Station, Research Bulletin 467, pp. 1–46 (December 1950)). These processes are labor intensive and poorly suited for waxing commercial quantities of eggs. In addition, they can merely encapsulate the eggs in wax. A wax coating that merely encapsulates an egg is prone to breaking, cracking and the like. Once the integrity of the external wax coating is lost, unwanted contaminants including toxic chemicals, pathogens and the like may find their way into the in-shell egg through pores in its shell.

Waxing of other foods is addressed in U.S. Pat. No. 3,046,143 (waxing raisins); U.S. Pat. No. 2,337,666 (waxing hams); U.S. Pat. No. 1,943,468 (applying a wax emulsion coating on fruit); and U.S. Pat. No. 3,420,790 (applying aqueous emulsions on fruits and vegetables); and in French patent FR 2680951-A (dropping fruits, vegetables, cheeses and other food items through a melted wax layer disposed on the surface of a warm layer of water, through the warm layer of water, and into a cool layer of water underlying the warm layer of water).

SUMMARY OF THE INVENTION

A process of the invention comprises transporting in-shell eggs through at least one molten wax layer disposed on a surface of a heated liquid. In embodiments, the heated liquid is vertically perturbated; the wax and surfaces of the eggs are sufficiently close to the same temperature to produce adhesive sealing of pores in the egg shells; the same eggs are repeatedly transported through molten wax; the eggs are transported in at least one stack of a plurality of layers of the eggs through the wax; the eggs are maintained in the heated liquid until the eggs are pasteurized by absorbing heat from the liquid without substantially impairing the functionality of the eggs; and/or the eggs are transported through the wax using transporting equipment that passes through the molten wax layer into the heated liquid. The invention also comprises waxed eggs in which the pores in the shells are adhesively sealed by wax, preferably applied in accordance with a process of the invention.

DETAILED DESCRIPTION OF PREFERRED EMBODIMENTS

Figure 1:
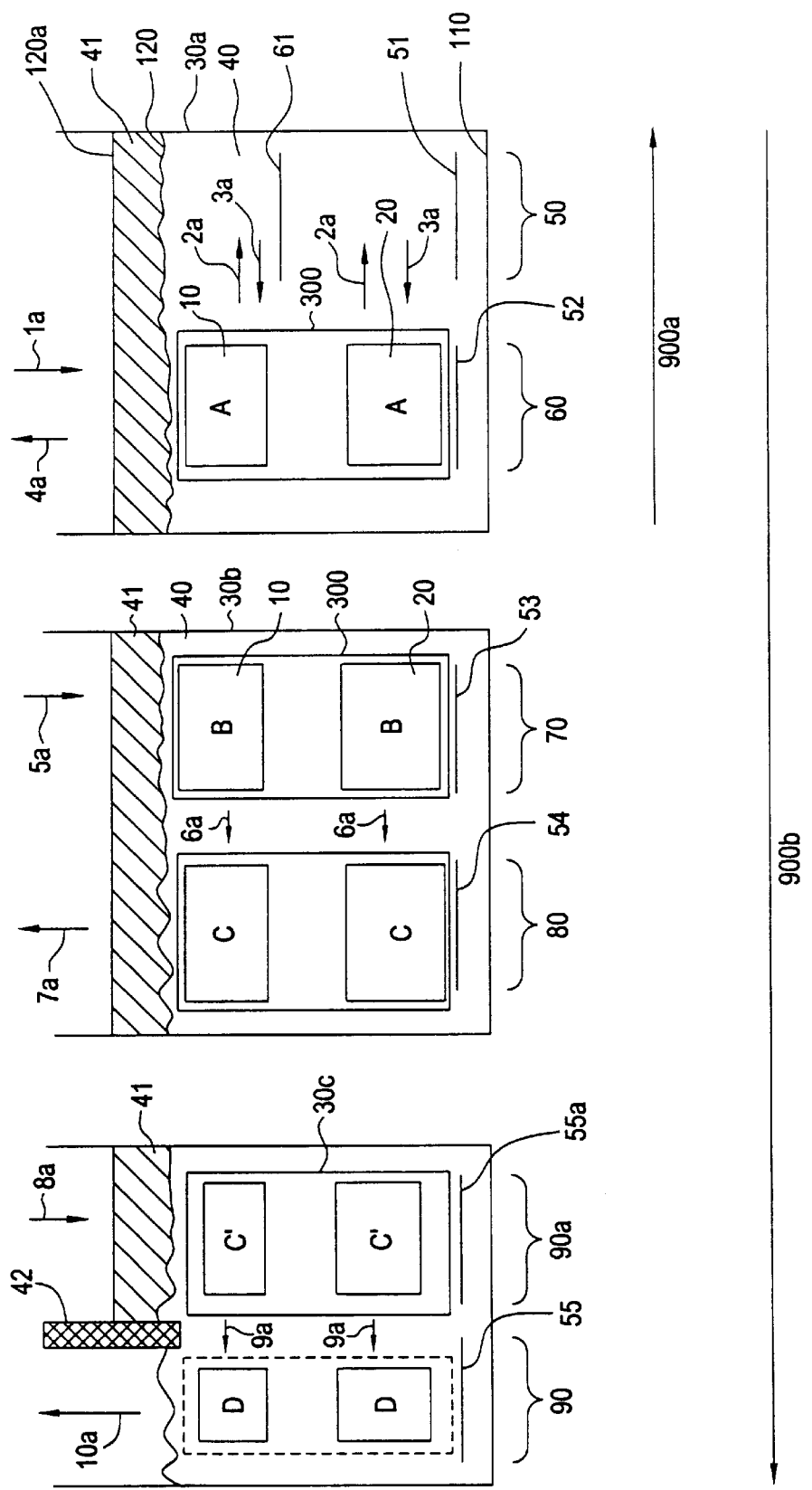
FIG. 1 schematically represents one embodiment of the claimed process.

The present invention is discussed in terms of stacks of eggs. However, in embodiments thereof, processes of the present invention may be applied to eggs that are not in stacks. Further, the terms "waxing" or "to wax" used herein include forming an external wax coating on the surface of an in-shell egg and/or adhesively sealing the pores of an in-shell egg.

In commercial operations, it is most desirable to wax at least one batch of several, tens, hundreds, or thousands of dozens of eggs together.

Large numbers of in-shell eggs are transported in stack formation by standard egg handling equipment designed to transport stacks of in-shell eggs. The stacks most standard in the industry contain about six layers of in-shell eggs per stack (or multiples thereof, e.g., 12, 18, 24, 30, 36, etc.). Further, each layer of in-shell eggs can contain about 30 in-shell eggs (or multiples thereof, e.g., 60, 90, 120, 150, 180, etc.). Conveniently, each layer of eggs is held in a 6-egg-by-5-egg flat. When a plurality of these layers of in-shell eggs is formed into one or more stacks, the stacks contain in-shell eggs located at their periphery extending all the way to their center. Existing industry-standard egg handling equipment is generally compatible with the present process for waxing stack(s) of in-shell eggs. An advantage of such a waxing process is to save the considerable expense of designing and implementing the use of new egg handling equipment.

Preferably, in order for the waxing process to be efficiently implemented, any flats holding the eggs in stacks should be sufficiently permeable to the molten wax to allow waxing of the entire surface of each egg held in the stack. Flats compatible with the present waxing process are described and depicted in simultaneously filed co-pending U.S. patent application Ser. No. 09/002,244 (WPB 39608), which is incorporated herein by reference in its entirety.

FIG. 1 depicts one embodiment of a process for waxing in-shell eggs. In that embodiment, fluid baths 30a, 30b and 30c are provided. Each such bath contains a heated liquid 40. On the surface of liquid 40 is a molten wax layer 41. In bath 30c, a dam 42 is provided as shown. Batches of stacks (10 and 20) of in-shell eggs are denoted by A, B, C, C' and D. The stacks (10 and 20) are provided in a carrier 300.

Before the start of the waxing process, liquid 40 is heated to a temperature sufficient to maintain wax layer 41 disposed on the surface thereof in a molten condition. The wax should be in a sufficiently molten state to permit waxing of the entire in-shell egg surface as an egg passes through the wax. The temperature of the liquid is thus dependent on the melting temperature of the wax. Preferably, the temperature is from about 130° F. to about 140° F. if the liquid is also to be used for pasteurizing the egg. However, the temperature of the liquid may be less than 130° F. depending upon the melting point of the wax.

The heated liquid 40 may be perturbated, preferably vertically perturbated, for example, by gas bubbles released into liquid 40. The perturbation can help maintain the entire thickness of the wax in a molten state without requiring that the liquid be at an inordinately high temperature, in spite of insulating properties of wax. For example, the wax layer can be an inch or more thick, preferably 2, 3, 4 or more inches thick. At such thicknesses, the wax layer itself acts as a heat insulator. This can be advantageous to reduce heat loss, as well as evaporation, of the liquid, particularly when the heated liquid is used to heat treat (e.g., pasteurize or cook) the eggs. However, without vertical perturbation, the insulating effect of the wax may result in a relatively cooler upper surface of a thick wax layer. This may cause crusting of the wax and/or impair the coating process. Vertical perturbation, particularly by a heated medium such as bubbles that have passed through the heated liquid, can avoid this phenomenon. Thus the wax temperature can be kept fairly uniform throughout its thickness, and the wax can be kept molten by a liquid only slightly above the melting temperature of the wax. Depending on the degree of vertical perturbation, for example, the liquid can be kept at, e.g., 1, 2, 3, 4, 5, 6, 7, 8, 9, 10 or more degrees Fahrenheit above the melting point of the wax. Additional details of exemplary liquid baths and means for perturbating the liquid 40 are given in co-pending simultaneously filed U.S. patent application Ser. No. 09/002,244 (WPB 39608).

Stacks 10 and 20 may be provided in a carrier 300. Carrier 300, the flats, and stacks thereof should be permeable not only to (1) liquid 40; (2) any gas bubbles provided to perturbate liquid 40; but also (3) wax layer 41 to allow waxing the entire surface of each egg contained in the stack(s). When carrier 300 is immersed into liquid 40 through the wax layer 41, molten wax surrounds the entire surface of each egg.

Preferably, each egg being immersed into liquid 40 through wax layer 41 for the first time is substantially dry. Otherwise, the molten wax may not adhere to the egg as it passes through the molten wax layer.

As the egg temperature is typically lower than that of the molten wax, an encapsulating external wax coating is initially formed around the entire surface of each egg. For adhesive sealing to occur, the surface temperature of the shell should be substantially the same as that of the molten wax 41. (However, there may be some variation in the wax and shell temperature depending on the identity of the wax, the thickness of the shell, the size of the pores and the like.) As the eggs are immersed into liquid 40 below wax layer 41, the egg temperature and the coated wax temperature approach one another at a temperature near or above the melting temperature of the wax. When the temperature of the eggs and that of the coated wax are substantially the same, the coated wax begins to adhesively seal the pores of the egg.

While the coated eggs are in heated liquid 40, excess wax melts off the eggs. At the same time, wax melts off of any flats and other equipment that have passed through the wax layer 41. Because it is lighter than the liquid 40, this melted wax floats back to the surface of liquid 40 to rejoin wax layer 41.

While all or substantially all of the wax is thus removed from the flats and other equipment (which are preferably non-porous), wax adheres to the egg shell, particularly within pores of the egg shell, due to the interaction between the egg shell and the wax. This results in a desirably thin coating that effectively seals the egg shell. Without being bound to theory, it is believed that the chemical composition of the egg shell, as well as its porosity, promotes such adhesion, which does not occur with other food products or the preferred flats and other equipment.

The above-described adhesive sealing effect can be highly advantageous. For example, during heating in liquid 40, air is expelled from the egg through its pores due to expansion of the liquid contents of the egg. Upon cooling, unless the pores are sealed, air or other cooling fluid, along with contaminants and other components thereof, is likely to re-enter the egg. This is avoided by adhesive sealing of the pores. Thus a cooling system can be used without fear of contamination. A preferred cooling system is disclosed in simultaneously filed U.S. patent application Ser. No. 09/001,673 (WPB 39610), which is incorporated herein by reference in its entirety. Furthermore, adhesive sealing of wax to the egg shell provides a tougher wax coating than a wax coating that merely encapsulates the egg. This permits use of a very thin wax coating that can remain continuous over the egg shell during handling without the risk of chipping and loss of protection that exists with encapsulating wax coatings. This thin but effective coating can be achieved by the processes described herein in which excess wax is melted off of the eggs by heated liquid 40.

Referring to the embodiment of FIG. 1, a batch A of eggs is lowered or otherwise immersed into liquid 40 by passing through a molten wax layer 41 disposed on the surface thereof. FIG. 1 shows a three-bath system. However, one, two, three or more baths can be used as desired, with wax layers disposed on one, two, three or more of the liquid baths independently of the number of baths. According to the embodiment of FIG. 1, the movement of a single carrier 300 containing a batch A of in-shell eggs is depicted by arrows 1a, 2a, 3a, 4a, 5a, 6a, 7a, 8a, 9a, and 10a. The overall lateral movement of a single batch A is depicted by arrows 900a and 900b. All of the depicted lateral movement is optional. Vertical movement of the carrier 300 may be accomplished by a loader/unloader. Lateral movement (which is optional within any single bath) is accomplished by a conveyer associated with the bath(s). However, any other method of vertical and/or lateral movement of stack(s) of in-shell eggs may be used. See, for example, co-pending U.S. patent application Ser. No. 09/002,244 (WPB 39608). If a bath contains a dam 42 as depicted in bath 30c, then a conveyor for moving the stack(s) which does not interfere with the operation of dam 42 should be used. For example, though not shown in FIG. 1, the conveyor may be located below the dam and batch D may be rolled off the conveyor onto an exit rails, a shelf, or the like so that even though the other batches (e.g. A, B, and/or C) may be moved, batch D remains stationary in exit zone 90 until removed from exemplary bath 30c.

Molten wax 41 is deposited on the egg shell as carrier 300 is moved through wax layer 41 into and out of liquid 40. For example, upon movement into bath 30a (arrow 1a) and out of bath 30a (arrow 4a), wax 41 is deposited on the shell. Upon movement of the same batch into (arrow 5a) and out of (arrow 7a) bath 30b (through wax layer 41), wax 41 is again deposited on the egg shell. Finally, movement of the same batch into (arrow 8a) bath 30c through molten wax layer 41 again causes wax to be deposited on the egg shell. It is preferred that the in-shell eggs pass through a wax layer 3 or more times, more preferably at least five times as shown in FIG. 1. Fewer passes may provide adequate sealing, while more passes provide a more uniform or continuous coating that effectively covers surface roughness of the egg shell.

While in the embodiment of FIG. 1, three separate baths, 30a, 30b and 30c are depicted, it may be preferred in some circumstances to use a single bath as opposed to a plurality of baths. In the case of using a single bath, carrier 300 can optionally be repeatedly moved vertically in and out of the bath. Further, a carrier 300 containing a batch of eggs may be passed in and out and back in to a bath through a molten wax layer 41 disposed on the surface of a heated liquid until sufficient wax is adhered to each in-shell egg. Thereafter, the batch of eggs can be moved laterally within a bath to a point where the liquid 40 does not have a molten layer 41 disposed on its surface. This can be achieved, for example, by the use of a dam such as dam 42 depicted in bath 30c, FIG. 1. After appropriate lateral movement of a given batch to a zone (e.g., zone 90, FIG. 1) that does not have a molten wax layer disposed on a surface thereof, the batch of eggs contained in carrier 300 can be removed out of fluid 40 without again passing through molten wax layer 41. This permits any flats and other equipment to leave the process substantially free of wax, as well as maintaining a desirably thin wax coating on the eggs.

As previously noted, the in-shell eggs may be transported through a wax layer 41 in at least one stack of a plurality of layers of eggs. Preferably, each layer of eggs is held in a flat. Preferably, the flats may be stacked upon one another to form the stack. The stacked flats should form cavities for loosely holding the eggs in layers thereof. In addition, the stacked flats and cavities are preferably configured to allow molten wax 41 to pass through the egg layers and along an entire surface of each egg within the layers.

Preferably, each stack comprises at least six layers of eggs. Further, it is preferred that each layer comprise at least 24 in-shell eggs. In addition, each stack comprises at least two flats and each flat may hold at least one layer of the eggs in cooperation with another vertically adjacent flat.

Loading and unloading equipment used to transfer a carrier 300 into and out of fluid 40 and through wax layer 41 may pass through the molten wax layer 41 into heated liquid 40. As described above, wax buildup on the equipment can be avoided in spite of the fact that the equipment passes through the wax layer.

Any wax sufficient to wax an in-shell egg that is safe for use with edible items such as fruits, vegetables and eggs may be used. Examples of suitable waxes include, but are not limited to, paraffin wax, microcrystalline wax and the like. Other examples of suitable waxes are provided in Remington's Pharmaceutical Sciences, Sixteenth Edition, Mack Publishing Company, Easton, Pa. (1980), incorporated herein by reference in its entirety.

Referring to pasteurization of in-shell eggs and their waxing, it is preferred that the heated liquid 40 in one or more of the baths provide at least about a 3 log to about a 5 log or more reduction in Salmonella or other pathogens associated with in-shell eggs. See E. M. Funk, Pasteurization of Shell Eggs, University of Missouri, College of Agriculture, Agricultural Experiment Station, Research Bulletin 364, pp. 1–28 (May 1943), incorporated herein by reference in its entirety. See, also, M. E. St. Louis et al., The Emergence of Grade A Eggs as a Major Source of *Salmonella enteritidis* infections, J. American Medical Associates, Volume 259, No. 14, pp. 2103–2107 (Apr. 8, 1988), incorporated herein by reference in its entirety. It is also preferred that the pasteurization be achieved without substantially impairing functionality of the eggs and without otherwise damaging any shells of the eggs. See also Davidson International Application No. PCT/US96/13006 (U.S. application Ser. No. 08/519,184), entitled PASTEURIZED IN-SHELL CHICKEN EGGS AND METHOD FOR PRODUCTION THEREOF; U.S. Pat. No. 4,503,320 (Polster); and WO 95/12320 (PCT/US94/12790; A PROCESS FOR HEAT TREATING FOOD PRODUCT; Polster).

All patents, patent applications, publications and references cited herein are incorporated herein by reference in their entirety.

What is claimed is:

1. A process for waxing in-shell eggs, comprising:
   transporting
   said in-shell eggs through at least one molten
      wax layer disposed on a surface of a heated liquid,
   wherein
   said heated liquid is vertically perturbated and
   wherein
   the liquid of said heated liquid is different from
      the wax of said at least one molten wax layer.

2. The process of claim 1, wherein said heated liquid is vertically perturbated by introducing bubbles of at least one gas through said liquid.

3. The process of claim 1, wherein said in-shell eggs are transported through said wax layer in at least one stack of a plurality of layers of said eggs.

4. The process of claim 3, wherein each said layer is held in a flat,
   wherein
   said flats are stacked to form said stack,
   wherein said stacked flats form cavities for loosely holding said eggs in said egg layers, and
   wherein said stacked flats and cavities are configured to allow said molten wax to pass through said egg layers and along an entire surface of said eggs in said layers.

5. The process of claim 3, wherein said stack is transported at least three times through said at least one molten wax layer.

6. The process of claim 1, wherein said in-shell eggs are immersed in said heated liquid such that a surface temperature of said in-shell eggs and the temperature of molten wax on surfaces of said in-shell eggs are brought to substantially the same temperature.

7. The process of claim 1, wherein said in-shell eggs are pasteurized by said heated liquid.

8. The process of claim 2, wherein said wax layer is rendered molten by heat from said heated liquid and said bubbles.

9. The process of claim 1, wherein said wax layer is at least three inches thick.

10. The process of claim 1, wherein said molten wax layer is maintained on only part of said surface of said heated liquid by a dam disposed through said surface and configured to keep said molten wax layer from spreading over an entirety of said surface while allowing passage of said eggs under said dam and out of said heated liquid without again passing through said molten wax layer.

11. A process for waxing in-shell eggs, comprising transporting at least one stack of a plurality of layers of said eggs through at least one molten wax layer disposed on a surface of a heated liquid;
   wherein the liquid of said heated liquid is different from the wax of said at least one molten wax layer.

12. The process of claim 11, wherein said stack comprises at least six said layers.

13. The process of claim 12, wherein said layers each comprise at least 24 said eggs.

14. The process of claim 11, comprising at least three times transporting said at least one stack of a plurality of layers of said eggs through said at least one wax layer.

15. The process of claim 14, wherein said liquid is vertically perturbated by passing bubbles of at least one gas through said liquid.

16. The process of claim 11, wherein said at least one stack comprises at least two, flats, each flat holding at least one of said layers of said eggs in cooperation with another vertically adjacent flat.

17. The process of claim 16, wherein said transporting step comprises lowering said stack of layers of said eggs through said wax layer using transferring equipment that passes through said molten wax layer into said heated liquid.

18. The process of claim 11, wherein said molten wax layer is maintained on only a part of said surface of said heated liquid by a dam disposed through said surface and configured to keep said molten wax from spreading over an entirety of said surface while allowing passage of said at least one stack under said dam and out of said heated liquid without again passing through said molten wax layer.

19. The process of claim 11, wherein said in-shell eggs are immersed in said heat heated liquid such that surfaces of said in-shell eggs and molten wax on surfaces of said in-shell eggs are brought sufficiently close to the same temperature to produce adhesive sealing of pores in the shells of said eggs.

20. The process of claim 11, wherein said eggs are sufficiently heated by said heated liquid to provide at least a 5 log reduction in Salmonella without substantially impairing functionality of said eggs and without cracking any shells of said eggs.

21. A process for waxing and pasteurizing in-shell eggs, comprising:

transporting said in-shell eggs through at least one molten wax layer disposed on a surface of a heated liquid; and maintaining said in-shell eggs in said heated liquid until said eggs are pasteurized by absorbing heat from said liquid without substantially impairing functionality of said eggs.

22. The process of claim 21, wherein said in-shell eggs are in a stack comprising a plurality of layers of said eggs.

23. The process of claim 22, wherein each of said layers is held in at least one flat in cooperation with another vertically adjacent flat.

24. A process for waxing in-shell eggs, comprising:

transporting said in-shell eggs through at least one molten wax layer disposed on a surface of a heated liquid using transporting equipment that passes through said molten wax layer into said heated liquid;

wherein the liquid of said heated liquid is different from the wax of said at least one molten wax layer.

25. The process of claim 24, wherein said equipment comprises a stack of flats holding said in-shell eggs in a plurality of layers, and a loader that lowers said stack through said molten wax into said heated liquid.

26. The process of claim 25, wherein said molten wax is maintained on only a part of said surface of said heated liquid by a dam disposed through said surface and configured to keep said molten wax from spreading over an entirety of said surface while allowing passage of said stack under said dam and out of said heated liquid without passing again through said molten wax layer.

27. A process for waxing in-shell eggs, comprising:

transporting said in-shell eggs through at least one molten wax layer disposed on a surface of a heated liquid and into said heated liquid, wherein as the eggs are immersed into said heated liquid, surfaces of said in-shell eggs and molten wax on surfaces of said in-shell eggs are brought sufficiently close to the same temperature to produce adhesive sealing of pores in the shells of said in-shell eggs; and wherein the liquid of said heated liquid is different from the wax of said at least one molten wax layer.

28. The process of claim 27, wherein said heated liquid and said molten wax layer are vertically perturbated by introducing bubbles of at least one gas through said liquid and through said molten wax layer.

29. A process for waxing in-shell eggs, comprising:

transporting said in-shell eggs a plurality of times through at least one molten wax layer disposed on a surface of a heated liquid;

wherein the liquid of said heated liquid is different from the wax of said at least one molten wax layer.

30. The process of claim 29, wherein said eggs are transported through said at least one molten wax layer at least three times.

31. The process of claim 29, wherein said in-shell eggs are transported through said at least one molten wax layer in a plurality of layers forming at least one stack.

32. The process of claim 31, wherein said at least one molten wax layer is maintained on only a part of said surface of said heated liquid by a dam disposed through said surface and configured to keep said molten wax layer from spreading over an entirety of said surface while allowing passage of said stack under said dam and out of said heated liquid without again passing through said molten wax layer when being removed from said heated liquid.

* * * * *